(12) United States Patent
Feng

(10) Patent No.: US 8,018,701 B2
(45) Date of Patent: Sep. 13, 2011

(54) BACKLIGHT CONTROL CIRCUIT WITH PROTECTING CIRCUIT

(75) Inventor: Sha Feng, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 431 days.

(21) Appl. No.: 12/287,572

(22) Filed: Oct. 10, 2008

(65) Prior Publication Data

US 2009/0097180 A1    Apr. 16, 2009

(30) Foreign Application Priority Data

Oct. 10, 2007 (CN) .......................... 2007 1 0123811

(51) Int. Cl.
    *H02H 3/20* (2006.01)
(52) U.S. Cl. .......................... 361/91.1; 361/56; 361/111
(58) Field of Classification Search .................... 361/56, 361/91.1, 111; 315/308
    See application file for complete search history.

(56) References Cited

U.S. PATENT DOCUMENTS

| 4,949,020 A * | 8/1990 | Warren et al. ................. 315/297 |
| 5,513,058 A * | 4/1996 | Hollenbeck ....................... 361/36 |
| 6,359,391 B1 | 3/2002 | Li |
| 6,657,838 B2 | 12/2003 | Min |
| 6,809,938 B2 * | 10/2004 | Lin et al. .......................... 363/17 |
| 2006/0158136 A1 * | 7/2006 | Chen .............................. 315/308 |

FOREIGN PATENT DOCUMENTS

CN 200950192 Y 9/2007

* cited by examiner

*Primary Examiner* — Rexford Barnie
*Assistant Examiner* — Tien Mai
(74) *Attorney, Agent, or Firm* — Altis Law Group, Inc.

(57) ABSTRACT

An exemplary backlight control circuit includes a load (250), an inverter circuit (230), a pulse width modulation integrated circuit (PWM IC) (210), a protecting circuit (270), and a feedback circuit (240). The load (250) includes two backlight lamps (251, 252) with first terminals (241). The PWM IC with a protecting output (215) is connected to the load via the inverter circuit. The protecting circuit has a reference voltage. The first feedback circuit is capable of outputting a voltage to the protecting circuit corresponding to the voltage detected from the first terminals. The protecting circuit is configured to control the PWM IC to stop outputting a backlight adjusting signal to the inverter circuit such that the inverter circuit stops driving the load when the output voltage is higher than the reference voltage of the protecting circuit.

12 Claims, 2 Drawing Sheets

BACKLIGHT CONTROL CIRCUIT WITH PROTECTING CIRCUIT

FIELD OF THE INVENTION

The present invention relates to a backlight control circuit with a protecting circuit, the backlight control circuit typically being used in a liquid crystal display (LCD).

GENERAL BACKGROUND

LCDs are widely used in various modern information products, such as notebooks, personal digital assistants (PDAs), video cameras and the like. Because liquid crystal in an LCD does not emit any light itself, a backlight system is usually needed to enable the LCD to display images.

A typical backlight system includes a plurality of backlight lamps, and a backlight control circuit. The backlight control circuit is used for feeding back currents of the backlight lamps, and protecting the backlight system when an open circuit occurs in any of the backlight lamps.

Referring to FIG. 3, one such backlight control circuit 100 includes a pulse width modulation integrated circuit (PWM IC) 110, an inverter circuit 130, a backlight lamp unit 150, a first feedback circuit 140, a second feedback circuit 160, and a protecting circuit 170.

The backlight lamp unit 150 includes a first lamp 151 and a second lamp 152. The first lamp 151 and the second lamp 152 both have a positive end and a negative end. The PWM IC 110 includes a signal output terminal 111, a current feedback terminal 113, a protecting output terminal 115, and a voltage feedback terminal 116. The signal output terminal 111 is connected to the inverter circuit 130. The voltage feedback terminal 116 is connected to the first feedback circuit 140. The current feedback terminal 115 is connected to the second feedback circuit 160. The protecting output terminal 115 is connected to the protecting circuit 170.

The inverter circuit 130 includes a signal input 131, a first driving terminal 132, and a second driving terminal 133. The first driving terminal 132 and the second driving terminal 133 output an AC voltage to the positive ends of the lamps 151, 152 respectively. A value of the AC voltage can be 1500V. The AC voltage at the first driving terminal 132 has a phase opposite to that at the second driving terminal 133.

The first feedback circuit 140 includes two high voltage feedback inputs 141 and a high voltage feedback output 142. The two high voltage feedback inputs 141 are connected to the positive ends of the lamps 151, 152 respectively. The high voltage feedback output 142 is connected to the voltage feedback terminal 116 of the PWM IC 110. The first feedback circuit 140 outputs a first feedback signal to the voltage feedback terminal 116.

The second feedback circuit 160 includes a current input 161 and a low-voltage feedback output 162. The current input 161 is connected to the negative ends of the lamps 151, 152. The low-voltage feedback output 162 is connected to the current feedback terminal 113 of the PWM IC 110. The second feedback circuit 160 outputs a second feedback signal to the PWM IC 110 corresponding to the current at the negative ends of the lamps 151, 152.

The protecting circuit 170 includes a first resistor 171 and a capacitor 172. One end of the first resistor 171 is coupled with the protecting output terminal 115 of the PWM IC 110, and the other end of the first resistor 171 is grounded via the capacitor 172. The first resistor 171 is used for controlling the charging time of the capacitor 172.

When an open circuit occurs in any of the lamps 151, 152, the current input 161 feeds back the current of the lamps 151, 152, and the second feedback circuit 160 outputs a lower second signal to the PWM IC 110. When the second signal is lower than a first reference voltage, the PWM IC 110 outputs a pulse-time ratio signal to increase the working voltage of the backlight unit 150 through the inverter circuit 130. At the same time, the first feedback circuit 140 outputs the first signal to the PWM IC 110. The PWM IC 110 compares the first signal with a second reference voltage. When the first signal is higher than the second reference voltage, the PWM IC 110 outputs a signal to charge the capacitor 172 via the protecting output terminal 115. When the voltage of the capacitor 172 reaches a predetermined potential, for example 3V, the PWM IC 110 stops the inverter circuit 130 from driving the backlight lamp unit 150, so as to protect the backlight lamp unit 150.

As described above, the inverter circuit 130 stops the backlight lamp unit 150 after a period of time has elapsed from the time when the PWM IC 110 outputs the signal to charge the capacitor 172. During this period, the PWM IC 110 continuously increases the voltage difference between the lamps 151, 152. The voltage difference between the lamps 151, 152 may increase and induce a spark discharge. The spark discharge is liable to destroy the backlight lamp unit 150. Thus, the backlight control circuit 100 has low reliability.

It is, therefore, desired to provide a backlight control circuit that can overcome the above-described deficiencies.

SUMMARY

In an exemplary embodiment, a backlight control circuit includes a load, an inverter circuit, a pulse width modulation integrated circuit (PWM IC), a protecting circuit, and a feedback circuit. The load includes a plurality of backlight lamps. Each lamp includes a first terminal. The inverter circuit is configured to drive the load. The PWM IC is connected to the load via the inverter circuit. The PWM IC includes a protecting output. The protecting circuit is connected to the protecting output of the PWM IC. The protecting circuit has a reference voltage. The first feedback circuit is connected to the first terminals of the lamps, the PWM IC, and the protecting circuit. The first feedback circuit is capable of detecting voltage from the first terminals of the lamps. The first feedback circuit is capable of outputting a voltage to the protecting circuit. The output voltage is corresponded to the voltage detected from the first terminals. The protecting circuit is configured to control the PWM IC to stop outputting a backlight adjusting signal to the inverter circuit such that the inverter circuit stops driving the load when the output voltage is higher than the reference voltage of the protecting circuit.

Other novel features and advantages of the present backlight control circuit will become more apparent from the following detailed description when taken in conjunction with the accompanying drawings.

DETAILED DESCRIPTION OF EMBODIMENTS

Reference will now be made to the drawings to describe preferred and exemplary embodiments of the present invention in detail.

Figure 1:
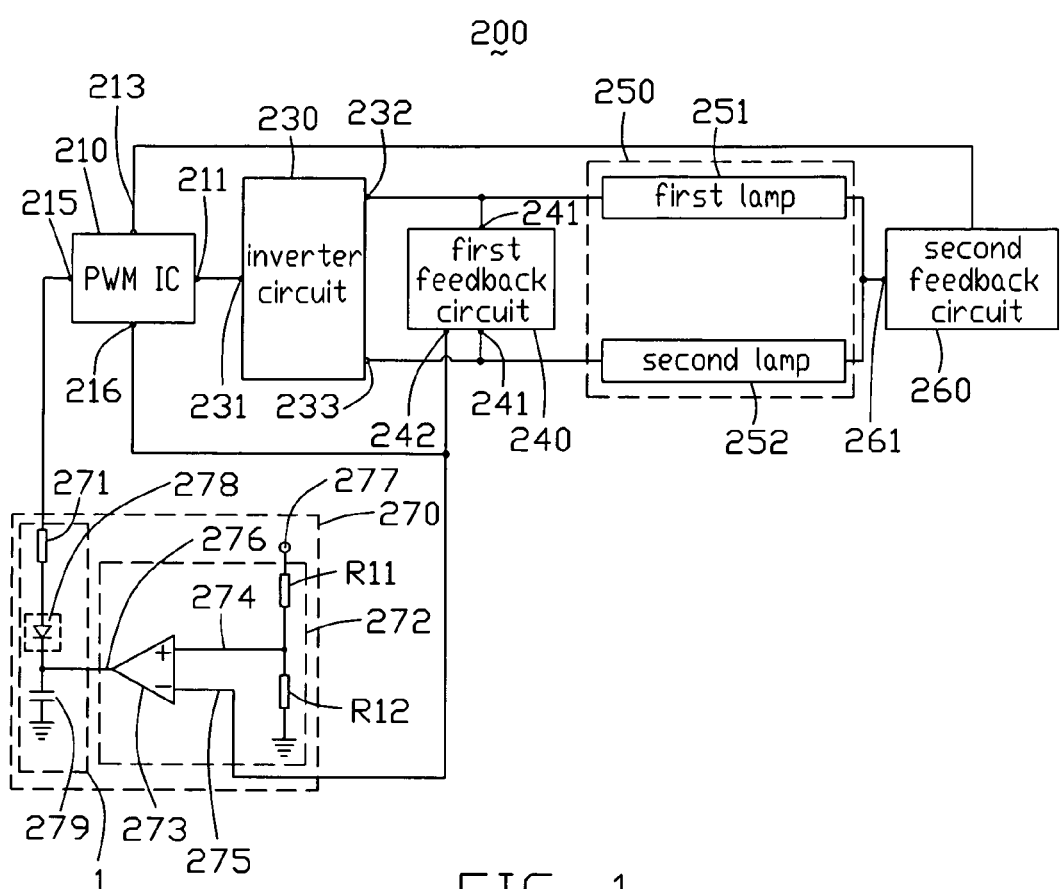
FIG. 1 is a diagram of a backlight control circuit according to an exemplary embodiment of the present invention.

FIG. 1 is an abbreviated circuit diagram of a backlight control circuit according to an exemplary embodiment of the present invention. The backlight control circuit 200 is typically installed in a backlight system (not shown). The backlight system can be used together with an LCD, both being installed in a product such as a notebook, a PDA, a video camera, etc. The backlight control circuit 200 includes a PWM IC 210, an inverter circuit 230, a load 250, a first feedback circuit 240, a second feedback circuit 260, and a protecting circuit 270. The PWM IC 210 outputs a backlight correction signal to the inverter circuit 230, and the inverter circuit 230 drives the load 250 to function. The first feedback circuit 240 is connected to the load 250 to feed back signals to the PWM IC 210 and the protecting circuit 270. The second feedback circuit 260 outputs a signal to the PWM IC 210 corresponding to the current of the load 250.

The load 250 includes a first lamp 251 and a second lamp 252. Each of the lamps 251, 252 has a first terminal and a second terminal. The PWM IC 210 includes a signal output end 211, a current feedback end 213, a protecting output 215, and a voltage feedback end 216. The signal output end 211 is connected to the inverter circuit 230. The current feedback end 213 is connected to the second feedback circuit 260. The voltage feedback end 216 is connected to the first feedback circuit 240. The protecting output 215 is connected to the protecting circuit 270.

The inverter circuit 230 includes a signal input end 231, a first driving end 232, and a second driving end 233. The signal input end 231 is connected to the signal output end 211 of the PWM IC 230. The first driving end 232 is connected to the first terminal of the first lamp 251 to supply a high alternating current (AC) voltage, and the second driving end 233 is connected to the first terminal of the second lamp 252 to supply another high AC voltage. A value of each high AC voltage can be 1500V. The two AC voltages have an opposite phase from each other.

The first feedback circuit 240 includes two high voltage detecting terminals 241, and a feedback signal output terminal 242. The two high voltage detecting terminals 241 are connected to the first terminals of the first and second lamps 251, 252, respectively. The feedback signal output terminal 242 is connected to the voltage feedback end 216 of the PWM IC 210.

The second feedback circuit 260 includes a current voltage detecting terminal 261. The current voltage detecting terminal 261 is connected to the second terminals of the lamps 251, 252.

The protecting circuit 270 includes a charging branch 1, and a comparison circuit 272. The comparison circuit 272 controls the charging branch 1 to be charged or discharged. The charging branch 1 includes a current-limiting resistor 271, a switch element 278, and a charging capacitor 279. One end of the current-limiting resistor 271 is connected to the protecting output 215 of the PWM IC 210. The other end of the current-limiting resistor 271 is grounded via the switch element 278 and the charging capacitor 279 in sequence. The switch element 278 is typically a diode, which includes a positive terminal connected to the current-limiting resistor 271, and a negative terminal connected to the charging capacitor 279.

The comparison circuit 272 includes a comparator 273, a first resistor R11, a second resistor R12, and a reference voltage input terminal 277. The comparator 273 has a positive input 274, a negative input 275, and an output end 276. The reference voltage input terminal 277 is grounded via the first resistor R11 and the second resistor R12. The positive input 274 is connected to a node between the first resistor R11 and the second resistor R12, and is configured to set a first reference voltage which is greater than or equal to a second reference voltage of the PWM IC 210. The negative input 275 is connected to the feedback signal output terminal 242 of the first feedback circuit 240 to receive the first feedback signal. The output end 276 is connected to a node between the switch element 278 and the charging capacitor 279.

When an open circuit occurs in any of the lamps 251, 252 of the load 250, the current of the load 250 decreases. The second feedback circuit 260 sends a signal to the PWM IC 210 corresponding to the current. Then the PWM IC 210 provides a correction signal to the inverter circuit 230. The inverter circuit 230 outputs a higher voltage to the load 250. At the same time, the first feedback circuit 240 feeds back the voltage of the first terminals of the lamps 251, 252, and outputs voltage feedback signals to the PWM IC 210 and the protecting circuit 270. While the voltage feedback signal is higher than the second reference voltage of the PWM IC 210, the PWM IC 210 turns on its over voltage protection function. That is, the protecting output 215 of the PWM IC 210 outputs a charging signal to the charging capacitor 279 via the current-limiting resistor 271 and the switch element 278. While the voltage feedback signal is higher than the first reference voltage of the comparison circuit 272, the comparator 273 turns off the switch element 278 to cut off the charging branch 1. Therefore the protecting output 215 reaches a predetermined potential, for example, 3V, immediately. The PWM IC 210 stops outputting the charging signal to the charging capacitor 279 and stops outputting a backlight adjusting signal to the inverter circuit 230. The inverter circuit 230 turns off the load 250 to protect the load 250 from spark discharge.

The backlight control circuit 200 includes the comparison circuit 272 and the switch element 278. The comparison circuit 272 receives the voltage feedback signal. When the voltage feedback signal is higher than the first reference voltage, the PWM IC 210 consequently stops outputting the backlight adjusting signal to the inverter circuit 230. The inverter circuit 230 turns off the load 250 according to the dormant PWM IC 210, so as to protect the load 250 from spark discharge. Therefore the backlight control circuit 200 has high reliability.

Figure 2:
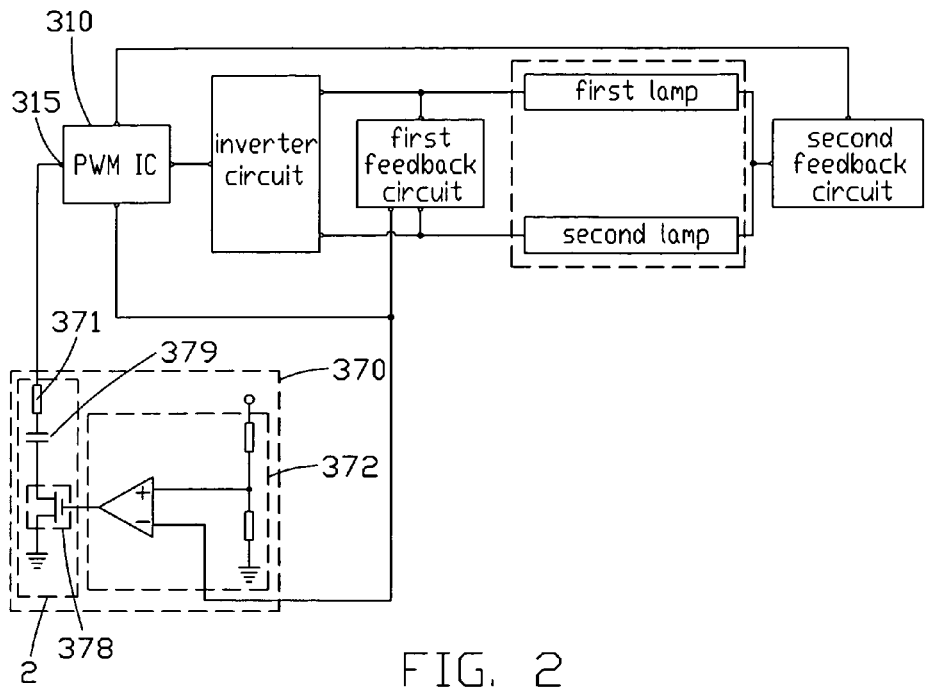
FIG. 2 is a diagram of a backlight control circuit according to another exemplary embodiment of the present invention.
Figure 3:
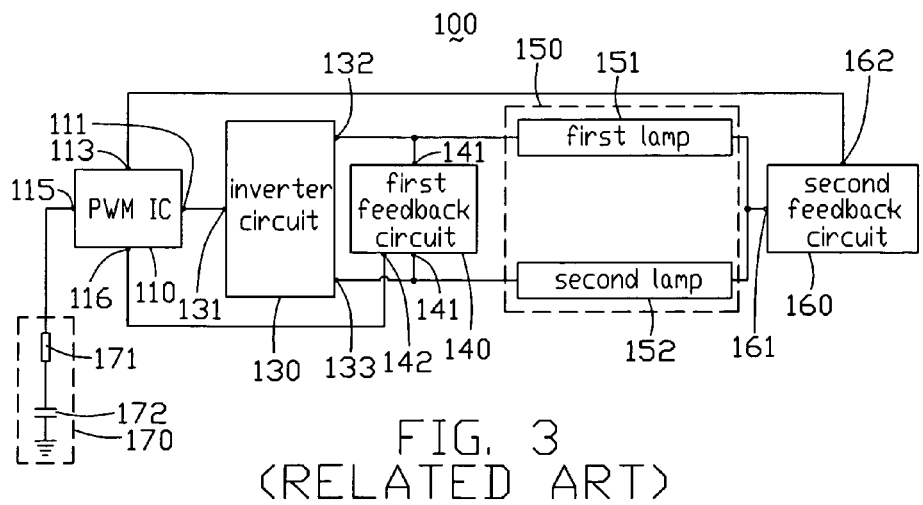
FIG. 3 is a diagram of a conventional backlight control circuit.

FIG. 2 is a diagram of a backlight control circuit 300 according to another exemplary embodiment of the present invention. The backlight control circuit 300 is similar to the above-described backlight control circuit 200, only differing in that a charging branch 2 of a protecting circuit 370 includes a current-limiting resistor 371, a switch element 378, and a charging capacitor 379. One terminal of the current-limiting resistor 371 is connected to a protecting output 315 of a PWM IC 310. The other terminal of the current-limiting resistor 371 is grounded via the switch element 378 and the charging capacitor 379 in sequence. The switch element 378 is typically a negative-channel metal-oxide semiconductor (NMOS) transistor, which includes a source electrode, a gate electrode, and a drain electrode. The source electrode is connected to the comparison circuit 372, the drain electrode is grounded, and the gate electrode is connected to the charging capacitor 379. The NMOS transistor performs substantially the same function as the diode (switch element 278). Compared with the backlight control circuit 200, the backlight control circuit 300 can achieve substantially the same function and advantages.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of the present invention to the full extent indicated by the broad general meaning of the terms in which the appended claims are expressed.

What is claimed is:

1. A backlight control circuit, comprising:
a load comprising a plurality of lamps, each lamp including a first terminal;
an inverter circuit configured to drive the load;
a pulse width modulation integrated circuit (PWM IC) connected to the load via the inverter circuit, and comprising a protecting output;
a protecting circuit connected to the protecting output of the PWM IC, the protecting circuit having a reference voltage and comprising a charging branch and a comparison circuit, the comparison circuit configured for cutting off the charging branch; and
a first feedback circuit connected to the first terminals of the lamps, the PWM IC, and the protecting circuit, the first feedback circuit capable of detecting voltage from the first terminals of the lamps;
wherein the first feedback circuit is capable of outputting a voltage to the protecting circuit, the output voltage corresponding to the voltage detected from the first terminals, and the protecting circuit is configured to control the PWM IC to stop outputting a backlight adjusting signal to the inverter circuit such that the inverter circuit stops driving the load when the output voltage is higher than the reference voltage of the protecting circuit;
wherein the comparison circuit comprises a comparator including a positive input, a negative input, and an output end, a first resistor, a second resistor, and a reference voltage input terminal, the reference voltage input terminal is grounded via the first resistor and the second resistor in sequence, the positive input of the comparator is connected to a node between the first resistor and the second resistor, the negative input of the comparator is connected to the first feedback circuit, the charging branch comprises a current-limiting resistor, a diode, and a charging capacitor, and the current-limiting resistor is grounded via the diode and the charging capacitor in sequence, a positive terminal of the diode connected to the current-limiting resistor and a negative terminal of the diode connected to the comparison circuit and the charging capacitor.

2. The backlight control circuit of claim 1, wherein each lamp further includes a second terminal, the load further comprises an output, and the output is configured to output a current signal corresponding to the second terminals of the lamps.

3. The backlight control circuit of claim 2, further comprising a second feedback circuit, which is connected between the output of the load and the PWM IC, and is capable of receiving the current signal.

4. The backlight control circuit of claim 3, wherein if the current signal detected by the second feedback circuit increases, the second feedback circuit drives the PWM IC to provide a correction signal to the inverter circuit, and the inverter circuit increases the output voltage applied to the load.

5. The backlight control circuit of claim 4, wherein the PWM IC sets a reference signal, and the reference signal has a voltage less than or equal to the reference voltage of the protecting circuit.

6. The backlight control circuit of claim 5, wherein when the voltage detected by the first feedback circuit is higher than the reference signal of the PWM IC, the protecting end of the PWM IC outputs a charge signal to charge the charge capacitor until the voltage detected by the first feedback circuit is greater than the reference voltage of the protecting circuit, so that the charge signal on the protecting end of the PWM IC achieves a predetermined value and then the PWM IC stops outputting the backlight adjusting signal to the inverter circuit.

7. A backlight control circuit, comprising:
a load comprising a plurality of lamps, each lamp including a first terminal;
an inverter circuit configured to drive the load;
a pulse width modulation integrated circuit (PWM IC) connected to the load via the inverter circuit, and comprising a protecting output;
a protecting circuit connected to the protecting output of the PWM IC, the protecting circuit having a reference voltage and comprising a charging branch, a comparison circuit configured for cutting off the charging branch; and
a first feedback circuit connected to the first terminals of the lamps, the PWM IC, and the protecting circuit, the first feedback circuit capable of detecting voltage from the first terminals of the lamps;
wherein the first feedback circuit is capable of outputting a voltage to the protecting circuit, the output voltage corresponding to the voltage detected from the first terminals, and the protecting circuit is configured to control the PWM IC to stop outputting a backlight adjusting signal to the inverter circuit such that the inverter circuit stops driving the load when the output voltage is higher than the reference voltage of the protecting circuit;
wherein the comparison circuit comprises a comparator including a positive input, a negative input, and an output end, a first resistor, a second resistor, and a reference voltage input terminal, the reference voltage input terminal is grounded via the first resistor and the second resistor in sequence, the positive input of the comparator is connected to a node between the first resistor and the second resistor, the negative input of the comparator is connected to the first feedback circuit, the charging branch comprises a current-limiting resistor, a switch element, and a charging capacitor, and the current-limiting resistor is grounded via the switch element and the charging capacitor in sequence;
wherein the switch element is a negative-channel metal-oxide semiconductor (NMOS) transistor comprising a source electrode, a gate electrode, and a drain electrode.

8. The backlight control circuit of claim 7, wherein each lamp further includes a second terminal, the load further comprises an output, and the output is configured to output a current signal corresponding to the second terminals of the lamps.

9. The backlight control circuit of claim 8, further comprising a second feedback circuit, which is connected between the output of the load and the PWM IC, and is capable of receiving the current signal.

10. The backlight control circuit of claim 9, wherein if the current signal detected by the second feedback circuit increases, the second feedback circuit drives the PWM IC to provide a correction signal to the inverter circuit, and the inverter circuit increases the output voltage applied to the load.

11. The backlight control circuit of claim 10, wherein the PWM IC sets a reference signal, and the reference signal has a voltage less than or equal to the reference voltage of the protecting circuit.

12. The backlight control circuit of claim 11, wherein when the voltage detected by the first feedback circuit is greater than the reference signal of the PWM IC, the protecting end of the PWM IC outputs a charge signal to charge the charge capacitor until the voltage detected by the first feedback circuit is higher than the reference voltage of the protecting circuit, so that the charge signal on the protecting end of the PWM IC achieves a predetermined value and then the PWM IC stops outputting the backlight adjusting signal to the inverter circuit.

* * * * *